United States Patent [19]

Freudberg et al.

[11] Patent Number: 4,696,031
[45] Date of Patent: Sep. 22, 1987

[54] SIGNAL DETECTION AND DISCRIMINATION USING WAVEFORM PEAK FACTOR

[75] Inventors: Richard L. Freudberg, Auburndale, Mass.; Marshall B. Garrison, Derry, N.H.

[73] Assignee: Wang Laboratories, Inc., Lowell, Mass.

[21] Appl. No.: 815,424

[22] Filed: Dec. 31, 1985

[51] Int. Cl.$^4$ ............................................. H04M 3/22
[52] U.S. Cl. ........................................ 379/386; 379/69; 379/92; 379/209; 379/257
[58] Field of Search ............... 179/84 VF, 5 R, 18 B, 179/2 DP, 90 B; 370/110.1, 110.3; 381/56; 379/379, 386, 257, 209, 92, 69

[56] References Cited

U.S. PATENT DOCUMENTS

| | | | |
|---|---|---|---|
| 3,899,645 | 8/1975 | Brafman | 379/355 |
| 4,028,493 | 6/1977 | Brennemann et al. | 379/99 |
| 4,201,896 | 5/1980 | Bower et al. | 379/67 |
| 4,356,348 | 10/1982 | Smith | 379/34 |
| 4,405,833 | 9/1983 | Cave et al. | 379/34 |
| 4,439,639 | 3/1984 | Munter | 379/386 |
| 4,469,916 | 9/1984 | de Bergh et al. | 379/73 |
| 4,528,664 | 7/1985 | Cheng et al. | 379/386 |
| 4,570,235 | 2/1986 | Kerdoncuff et al. | 379/386 |
| 4,626,629 | 12/1986 | Premoli et al. | 379/386 |

Primary Examiner—Gene Z. Rubinson
Assistant Examiner—C. Champion
Attorney, Agent, or Firm—Michael H. Shanahan

[57] ABSTRACT

Apparatus and method for detecting and discriminating among various signals indicative of progress while making a telephone connection. A particular waveform parameter known as peak factor is advantageously employed in a call progress analyzer. The illustrative call progress analyzer uses the average magnitude peak factor (ratio of the peak of the waveform to the average of the absolute value of the waveform) to distinguish among single-tone signals (e.g., special service information tones), double-tone signals (e.g., dial tone, audible ring, and busy), and speech. Waveform ON and OFF times (duration above and below an energy threshold) are combined with signal-type determinations (made using peak factor) to automatically determine the status of a call.

41 Claims, 8 Drawing Figures

FIG. 4A

| $S_j$ | $S_{j-1}$ | $S_{j-2}$ | $S_{j-3}$ | $S_{j-4}$ | $S_{j-5}$ | $S_{j-6}$ | $S_{j-7}$ |
|---|---|---|---|---|---|---|---|
| $T_j$ | $T_{j-1}$ | $T_{j-2}$ | $T_{j-3}$ | $T_{j-4}$ | $T_{j-5}$ | $T_{j-6}$ | $T_{j-7}$ |

FIG. 4B — SSIT

| SP | 0 | 1T | 0 | 0 | 0 | 0 | 0 |
|---|---|---|---|---|---|---|---|
| 500 | 200 | 1000 | 0 | 0 | 0 | 0 | 0 |

FIG. 4C — ANSWER AFTER 2 RINGS

| SP | 0 | 2T | 0 | 2T | 0 | 0 | 0 |
|---|---|---|---|---|---|---|---|
| 250 | 1500 | 2000 | 4000 | 2000 | 0 | 0 | 0 |

FIG. 4D — FAST BUSY

| 2T | 0 | 2T | 0 | 2T | 0 | 2T | 0 |
|---|---|---|---|---|---|---|---|
| 250 | 250 | 250 | 250 | 250 | 250 | 250 | 250 |

FIG. 4E — RING

| 2T | 0 | 2T | 0 | 2T | 0 | 2T | 0 |
|---|---|---|---|---|---|---|---|
| 4000 | 2000 | 4000 | 2000 | 4000 | 2000 | 4000 | 2000 |

SIGNAL DETECTION AND DISCRIMINATION USING WAVEFORM PEAK FACTOR

FIELD OF THE INVENTION

The present invention relates to signal processing apparatus and methods useful in detecting and discriminating among various types of electronic signals, especially signals indicative of the progress of calls in telephone systems.

BACKGROUND

Telephone systems were originally developed for use by people. A person would dial the desired number, then determine whether the called party answered by listening to the line. The telephone system provides various signals to aid the calling party in determining the progress of the call they are placing. These include dial tone, audible ring (the ring indication heard by the calling party), busy signals, and special service information tones (SSIT) (an SSIT is typically followed by a recorded voice announcement indicating such conditions as all circuits are busy, the dialed number is no longer in service, etc.).

Increasingly, various types of apparatus are working with people in their use of the telephone system, and in some cases automated systems are placing calls independent of any person's supervision.

The following example illustrates the need for automatic call progress analysis. It is typical for voice message systems to require that message recipients call the voice message system to receive their messages. Sometimes it is desirable for a voice message system to call the recipient, rather than wait for the recipient to call the system. In such situations it is necessary for the voice message system to perform call progress analysis, in order to reliably deliver voice messages.

Automatic call progress analysis can also be useful when a computer is placing a call for a person. Someone might select a number to be dialed from a computer-based telephone list. The computer could place the call and indicate to the person when the telephone has been answered without the person needing to listen to the intervening telephone line activity.

In order for a machine to be able to reliably place calls, it is useful for the machine to be able to track a call's progress by recognizing the various signals a calling party receives. It is important to be able to detect and identify the various progress tones (e.g., dial tone, ring, busy, SSIT) and to detect speech and accurately distinguish it from the other signals indicating call progress (i.e., the progress tones).

Dialtone, ring, and busy signals are normally double-tone signals, i.e., each is the sum of two tones. For example, a dial tone typically is the sum of a 350 Hz tone and a 440 Hz tone; audible ring typically is the sum of a 440 Hz tone and a 480 Hz tone. SSITs are single-tone signals lasting for about one second in which the tone frequency is changed in discrete steps after each one-third of a second; an SSIT is normally followed by speech (in the form of a recorded announcement).

Speech is both one of the most important signals to recognize, and yet is one of the most difficult signals for a machine to recognize. Speech is difficult for a machine to recognize because of the great variability in speech waveforms. It is important to distinguish speech from the other call progress signals because the presence of speech typically indicates the end of a call delivery sequence: the presence of speech normally indicates that the phone has been answered and the call should be "delivered" (a connection to the called party has been completed and the call progress analysis portion of the system passes control to that portion of the system that will conduct the substance of the call), unless the speech follows an SSIT, which is also the end of the call delivery sequence, but indicates that the call attempt should be terminated.

One class of approaches to detection and discrimination of progress signals involves analysis of the cadence of the received signals. This starts by summarizing the received signals as an alternating series of signal-energy-present and signal-energy-absent intervals. The patterns of the durations of the signal-on intervals and the durations of the intervening signal-off intervals can often be used to distinguish among the various types of progress tones. This approach deals poorly with speech because speech can occur with highly varied timing patterns, including patterns that match those of progress tones. Although the irregularity of speech is a useful clue, this irregularity may only reveal itself after an unacceptably long period of time. Timing-based detection schemes also have difficulty dealing with nonstandard progress tones. For example, ring signals can take on a wide variety of different patterns depending on the telephone exchange generating the ring. Also, actual signals may vary in their timing substantially from the standard, due to equipment variability.

Another class of approaches involves the use of frequency measurement. In these systems, the detection/discrimination system has either a set of band-pass filters or is capable of determining the frequency spectrum of the received signal (i.e., by performing an FFT computation). As progress tones generally have characteristic tone structure, frequency analysis of the waveform received by the caller can extract a great deal of information about call progress. Again, speech can create discrimination problems because the frequency content of speech is highly variable. And, there is variability in the frequency information due to differences between telephone systems and the state of particular telephone equipment. In addition, the needed filters can be expensive and the FFT is computationally intensive.

Both cadence-based and frequency-based approaches tend to be limited by the lack of uniformity among and within telephone systems. There are no universally accepted standards: there are differences between older systems and newer systems; there are differences between systems in different geographic areas. The effect of even those standards that do exist is qualified by the fact that the standards are generally only recommendations and compliance is not mandated.

Therefore, it is an object of the present invention to detect and discriminate among call progress signals with a high degree of accuracy despite variations that exist among and within telephone systems.

A further object is to reliably distinguish speech from other call progress signals.

Further, it is an object to provide such detection and discrimination using a relatively modest amount of computing resources.

SUMMARY OF THE INVENTION

The present invention uses a waveform characteristic called peak factor to aid in the detection of and discrimination among certain types of signals. Peak factor is the ratio of the peak of the waveform to a measure of the signal level of the waveform; average magnitude and RMS are two useful measures of waveform signal level. Because peak factor is a normalized measure, it is basically independent of signal level. Peak factor ranges are identified for each of several signal types. Signal-type determinations are made by measuring the peak factor of a portion of a waveform and comparing the measured peak factor with the predetermined ranges. Presence of the measured peak factor within a particular range is an indication that a signal of the corresponding signal-type is represented by the analyzed portion of waveform.

Peak factor differs for signals having differing numbers of tones. Of particular interest in call progress analysis are the following types of signals: single-tones, double-tones, and speech. Non-overlapping peak factor ranges are specifically identified for these signal types.

Peak factor determinations are made on sequential portions of the waveform being analyzed. These individual measurements are then logically combined to arrive at signal-type determinations that are more global and more accurate.

Peak factor analysis can be used in conjunction with other waveform information, such as that obtained by cadence analysis, to arrive at a more precise signal-type determination than could have been achieved with either form of analysis alone. Specifically, energy threshold analysis (in which a measure of waveform signal level is compared to a threshold) is used to determine a series of signal-ON and signal-OFF time intervals. A plurality of peak-factor-based signal-type determinations are made for each ON interval. This plurality is then logically combined to produce a single signal-type determination for each ON interval. The ON interval signal types and the ON and OFF interval times are then logically combined to make determinations of the presence of the various logical signals that a calling party may expect to receive, such as dial tone, busy signal, audible ring, SSIT, and speech.

In deciding whether to deliver a telephone call, it is important to distinguish speech from call progression tones and to distinguish SSITs from the other progression tones. These three categories of signals each have peak factors, even considering such factors as additive noise, harmonic distortion, and frequency distortion, that fall in non-overlapping ranges. Thus, peak factor analysis is particularly useful in systems making automatic call delivery decisions.

BRIEF DESCRIPTION OF THE DRAWINGS

The invention is pointed out with particularity in the appended claims. The above and other advantages of the invention may be better understood by referring to the following detailed description in conjunction with the drawing, in which:

FIG. 4A shows the general arrangement of a table of signal-type data and interval-duration data used by the progress analysis decision logic of FIG. 3; and FIGS. 4B, 4C, 4D, and 4E are specific examples of how the table of FIG. 4A might look in certain situations.

DETAILED DESCRIPTION OF AN ILLUSTRATIVE EMBODIMENT

OUTLINE OF DETAILED DESCRIPTION

I. CALL PROGRESS ANALYSIS SYSTEM
A. PHYSICAL SYSTEM (FIG. 1)
B. OVERALL SIGNAL PROCESSING (FIG. 2)
C. CALL PROGRESS ANALYSIS (FIG. 3)
1. ENERGY MEASUREMENT
2. INTERVAL DETERMINATION AND GLITCH REMOVAL
3. PEAK FACTOR MEASUREMENT AND RANGE DETERMINATION
4. PEAK FACTOR DECISION LOGIC
5. CALL STATUS CONDITIONS REPORTED
6. PROGRESS ANALYSIS DECISION LOGIC (FIG. 4)
II. THEORETICAL CONSIDERATIONS
A. SYMBOLS AND TERMINOLOGY
B. "IDEAL" PEAK FACTORS
1. SINGLE-TONE SIGNALS
2. DOUBLE-TONE SIGNALS
3. SPEECH
C. VARIATIONS FROM "IDEAL" PEAK FACTOR
1. ADDITIVE NOISE
2. HARMONIC DISTORTION
3. UNEQUAL TONE AMPLITUDES
D. MEASUREMENT INTERVAL
E. AVERAGE MAGNITUDE RATHER THAN RMS
1. RELATION BETWEEN AVM AND RMS
2. AVM PEAK FACTOR RANGES CONSIDERING ADDITIVE NOISE
I. CALL PROGRESS ANALYSIS SYSTEM
I.A. PHYSICAL SYSTEM (FIG. 1)

Figure 1:
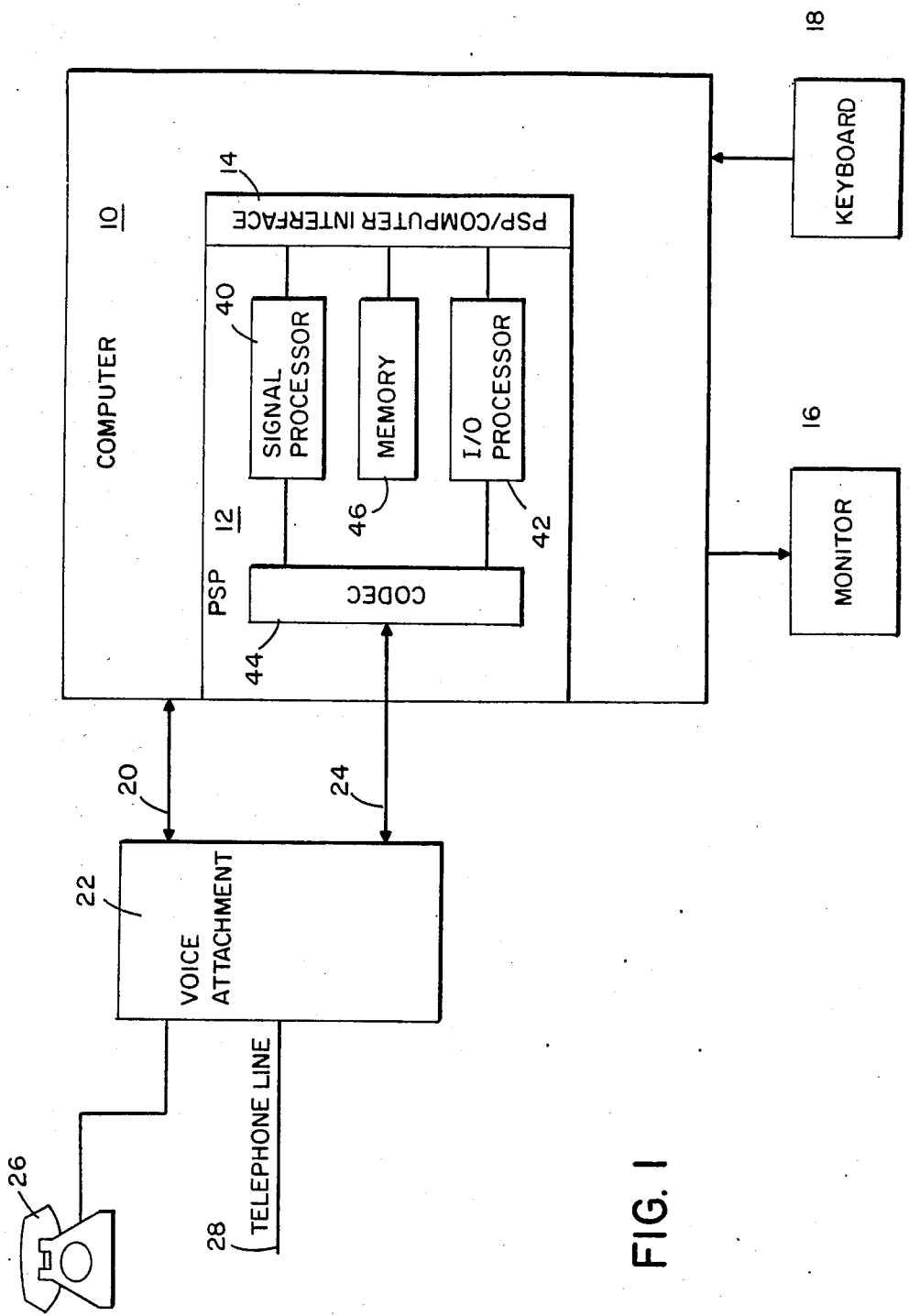
FIG. 1 is a block diagram of a computer and various attached devices arranged to employ the present invention.

Referring to FIG. 1, a computer 10 includes a programmable signal processor subsystem (PSP) 12, with which it communicates via a PSP/computer interface 14. The computer includes such conventional components as a processor, memory, and mass storage and is connected to a video display monitor 16 and a keyboard 18.

The computer 10 connects via digital control lines 20 to a voice attachment 22. The PSP 12 in the computer 10 connects via analog lines 24 to the voice attachment 22. The voice attachment 22, in response to signals on control lines 20, controls connection of a telephone 26, and the PSP 12 to a telephone line 28. The voice attachment 22 includes a 2-wire to 4-wire convertor (e.g., a hybrid coil) so that analog lines 24 include separate lines for carrying incoming and outgoing signals, and an automatic gain control (AGC).

The PSP 12 includes circuits that adapt it for efficient processing of digitized representations of waveforms. These include a Texas Instruments TMS32010 signal processor 40, an Intel 8089 I/O processor 42, a TP3050 Coder/Decoder (codec) 44, and memory 46.

The specialized instruction set of the signal processor 40 is designed to facilitate the types of numerically intensive operations useful in digital signal processing. Some instructions for the signal processor 40 and the I/O processor 42 permanently resident in a read-only portion of the memory 46, and other instructions are downloaded from the computer 10 into a read/write portion of the memory 46.

The codec 44 converts an analog waveform from analog lines 24 to 8-bit mu-law digital samples at the rate of 7000 samples/second. The codec 44 also converts digital samples into an analog waveform to be placed on analog lines 24.

I.B. OVERALL SIGNAL PROCESSING (FIG. 2)

Figure 2:
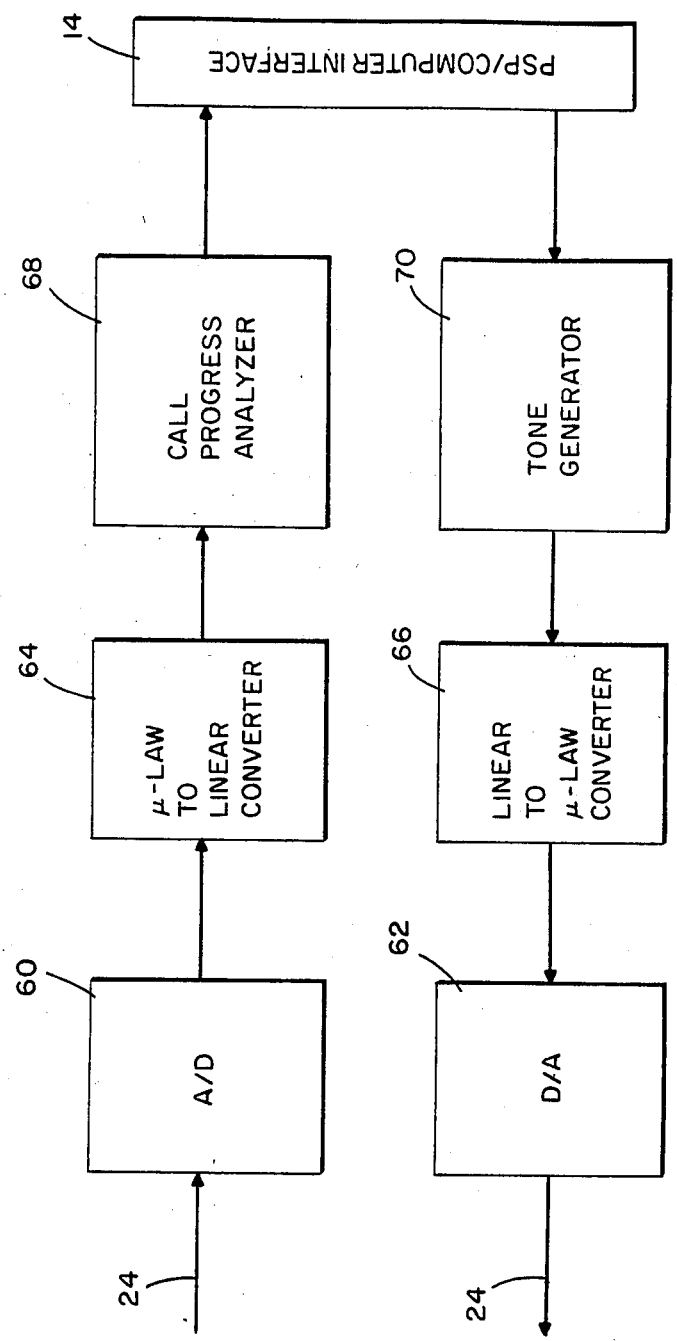
FIG. 2 is a block diagram of the major functions performed by the programmable signal processor (PSP) in the computer system of FIG. 1.

FIG. 2 shows the primary functions performed by PSP 12. The codec 44 performs both as an analog-to-digital (A/D) convertor 60 and as a digital-to-analog (D/A) convertor 62. The I/O processor 42 buffers incoming waveform samples and functions as a mu-law-to-linear convertor 64. The signal processor 40 functions as a call progress analyzer 68, as a tone generator 70 for generating the DTMF tones used in dialing, and as a linear-to-mu-law convertor 66 to prepare the waveform samples created by the tone generator 70 for D/A conversion by the codec 44. Thus, despite the fact that the codec 44 uses a non-linear conversion law, the signal processor 40 can work with samples that are linear representations of waveforms on analog lines 24.

As described above, lines 24 carry analog signals. The A/D 60 passes 8-bit mu-law encoded samples to convertor 64. Correspondingly, the convertor 66 passes 8-bit mu-law samples to the D/A 62. The convertor 64 provides 14-bit linear encoded waveform samples to the call progress analyzer 68. The tone generator 70 provides 14-bit linear samples to the convertor 66. The call progress analyzer 68 provides call status indications, which are communicated via interface 14 to computer 10. The tone generator 70 receives dialing commands from computer 10 via interface 14.

The I/O processor 42 accomplishes the conversion from mu-law to linear by table-lookup. The signal processor 40 generates the DTMF dialing tones by use of second order recursive difference equations.

I.C. CALL PROGRESS ANALYSIS (FIG. 3)

Figure 3:
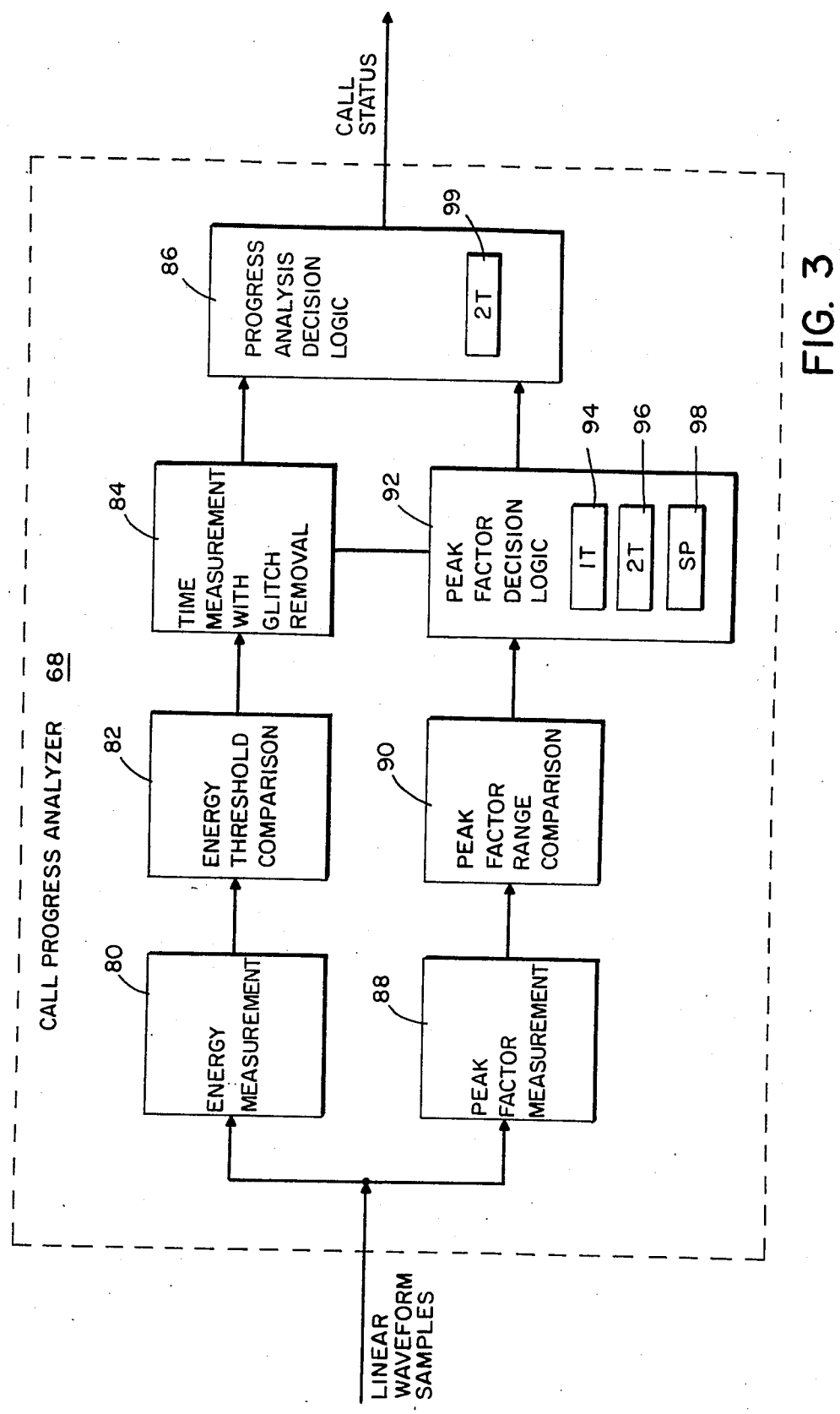
FIG. 3 is a block diagram detailing the call progress analyzer of FIG. 2.

FIG. 3 shows the processing operations performed by the call progress analyzer 68.

Waveform energy is measured by a means 80 and compared by a means 82 with an energy threshold. The durations which the waveform is above or below the energy threshold are determined by a means 84. The resulting series of ON (above threshold) and OFF (below threshold) times is then provided to the progress analysis decision logic 86.

Waveform peak factor is measured by a means 88 and compared by a means 90 with predetermined peak factor ranges for the several signal types (single-tone, double-tone, and speech). The series of signal-type determinations from the range comparator 90 are provided to the peak factor decision logic 92, which combines the various signal-type determinations that occur within each ON or OFF interval and makes a single signal-type determination for each ON and each OFF interval. The signal-type determinations for the ON and OFF intervals are provided to the progress analysis decision logic 86, which uses these determinations along with the interval duration determinations to determine call status. The resulting indications of call status are then made available via interface 14 to the computer 10.

I.C.1. ENERGY MEASUREMENT

Energy measurement 80 is accomplished by low pass filtering the magnitude of the waveform. The magnitudes of the samples (i.e., the sample values with the sign removed) are the input to a first order recursive difference equation. The output of this computation is a series of estimates of the energy level of the waveform.

The energy threshold used in the comparison 82 is not a single fixed value, but is switched among three values: 8, 16 and 145. When energy measurement begins, the threshold is set to 16. If a signal occurs which is identified as ring, then the threshold is dropped to 8. This aids in the detection of speech signals, which can have a lower energy level than the preceding ring signal. If the energy measurement rises above 145, then the threshold is set to 145. This reduces the likelihood of processing a spike as speech: a spike is likely to quickly fall below the 145 threshold; speech is likely to remain above the 145 threshold significantly longer.

I.C.2. INTERVAL DETERMINATION AND GLITCH REMOVAL

The time interval between the time when the energy measurement goes above the energy threshold and when the energy measurement next goes below the energy threshold is an ON interval; the time interval between when the energy measurement goes below the energy threshold and when the energy measurement next goes above the energy threshold is an OFF interval.

The definitions in the previous paragraph of ON and OFF intervals are qualified by the fact that certain logic is provided in the time measurement means 84 to remove from use in the time measurement process those energy threshold transitions attributed to "glitches", brief bursts of energy or brief energy dropouts.

The glitch rejection logic rejects bursts of energy lasting less than about 200 msec. Transient signals of short duration and having an exponentially decaying tone-like structure have been observed to occur frequently during the establishment of a telephone connection both prior to and after the phone has been answered. Those that occur prior to answer are usually due to connections being made in telephone switching equipment as the circuit is being established. Those that occur after the phone has been answered are usually the result of hook switch transients. These switching transients exhibit high peak factors, and can fall into the speech peak factor range. These signals are removed from consideration as speech or other signals on the basis of their short duration. The glitch removal logic combines an ON time of less than 200 msec with the OFF times of the two adjacent OFF intervals to form a single OFF interval, as if to "ride" across the glitch.

The glitch rejection logic removes short OFF times (dropouts) by a similar mechanism. Dropouts can occur during speech due to the wide dynamic range of speech, i.e., the speech may appear to go away because it has momentarily dropped below the energy threshold. OFF times less than 100 msec are combined with the adjacent ON times to form a single ON interval.

If a non-transient interval (an interval preceded and followed by energy threshold transitions not attributed to "glitches") is not found within a certain time period, a signal-timeout indication is provided by the time measurement logic 84 to the progress analysis decision logic 86. Following dialing, the time period is set to 45 seconds; thereafter the time period is set to 5 seconds.

The result of the energy measurement 80, energy threshold comparison 82, and time measurement 84 is a series of alternating ON times and OFF times. These ON times and OFF times are then provided to the progress analysis decision logic 86.

I.C.3. PEAK FACTOR MEASUREMENT AND RANGE DETERMINATION

Waveform samples are provided by the mu-law-to-linear convertor 64 to the peak factor measurement means 88 in blocks of 256 samples. Peak factor is not determined on a sample-by-sample basis; instead, a peak factor determination is made for each succeeding block of 256 samples. The interval corresponding to a block of 256 samples is called a measurement interval.

For each measurement interval, the peak factor measurement means 88 and the peak factor range comparator 90 combine to make a signal-type determination. The peak factor decision logic 92 then combines the determinations for the many measurement intervals that occur within each ON interval to make a single signal-type determination for each ON interval. No signal-type determination is made for an OFF interval as an OFF interval by its very nature concludes there is no signal.

The peak factor for a measurement interval is the ratio of the absolute value of the largest sample in the interval to the average of the magnitudes of the samples in the interval.

The peak factor range comparator 90 makes signal-type determinations by determining whether the peak factor for a measurement interval falls within one of three ranges as follows:

1.26–2.00: single-tone
2.34–2.71: double-tone
3.50–16.80: speech

If the peak factor does not fall within one of the ranges, then a NULL signal-type indication is provided for that measurement interval.

The ranges used in this illustrative embodiment are not contiguous. Alternatively, ranges could be chosen that are contiguous. For example, two thresholds could be used to define ranges for single-tones, double-tones, and speech: a first threshold could be used to separate single-tones from double-tones; a second threshold could be used to separate double-tones from speech. In such case, the single-tone range would be everything below the first threshold, the double-tone range would be everything between the first and second thresholds, and the speech range would be everything above the second threshold.

Although the above-listed ranges work well, further optimization may be possible. These ranges were determined by:

determining "ideal" peak factors using theoretical analysis and experimentation;

expanding ranges around these ideals in light of general understanding of how the measured peak factor is likely to vary from the ideal; and measuring and theoretical modeling of the peak factors of various waveforms under non-ideal conditions (e.g., additive noise, harmonic distortion).

Various considerations in determination of peak factor ranges are further discussed below.

Conceptually the comparisons performed for each range result in the determination of whether the following inequality is true:

LOWER RANGE BOUNDARY   PEAK FACTOR   UPPER RANGE BOUNDARY where

PEAK FACTOR=PEAK/AVERAGE MAGNITUDE

AVERAGE MAGNITUDE=SUM OF SAMPLE MAGNITUDES/#SAMPLES
SAMPLES=256
PEAK=MAXIMUM SAMPLE MAGNITUDE
SAMPLE MAGNITUDE=SAMPLE VALUE IGNORING THE SIGN

Although conceptually the peak factor is measured by the means 88 and then it is compared with the ranges by the means 90, in practice the computation of the peak factor and the comparison of the peak factor with the ranges are merged: the PEAK is compared with the product of the AVERAGE MAGNITUDE and the range boundaries as follows:

AVERAGE MAGNITUDE*LOWER RANGE BOUNDARY   PEAK and

PEAK   AVERAGE MAGNITUDE*UPPER RANGE BOUNDARY

This makes it possible to perform a multiply instead a more computationally time consuming divide operation. In other words, the PEAK is compared with scaled versions of the SUM OF SAMPLE MAGNITUDES. The scale factors are determined by the range boundaries and the #SAMPLES; these are constant, and therefore, the scale factors need be computed only once, and need not be computed each time the peak factor is computed.

In summary, the peak factor measurement means 88 and the peak factor range comparison 90 are accomplished by identifying the peak value, summing the sample magnitudes, multiplying to obtain scaled forms of the sum, and comparing the peak with the scaled forms of the sum.

I.C.4. PEAK FACTOR DECISION LOGIC

The waveforms being measured in any actual system are corrupted by noise and various types of distortion. In addition, speech is non-deterministic and only approximately characterized statistically. Thus, determinations of signal type are not perfectly accurate. Peak factor decision logic 92 is used to combine the signal-type determinations for individual measurement intervals to make determinations of the signal type of an overall ON interval with greater accuracy than that of any single measurement interval.

The peak factor decision logic 92 includes three counters: a single-tone counter 94, a double-tone counter 96, and a speech counter 98. Each counter counts (with minor modification discussed below) the number of measurement intervals for which the peak factor falls within the range corresponding to that counter's signal type.

At the beginning of an ON interval all three counters 94, 96, and 98 are set to zero. The double-tone counter 96 and speech counter 98 are also selectively set to zero whenever one of the other two counters reaches a value of 4 for the first time; the single-tone counter 94 is not reset when one of the other counters reaches 4. This counter logic tends to favor the peak factor measurements later in the ON interval over those that occur at the outset of the ON interval. This is desirable because signal level is often low at the onset of an ON interval and therefore early peak factor measurements are likely to be less reliable than are measurements later in the ON interval.

The single-tone counter 94 is treated differently so as to favor detection of an SSIT signal. It is especially important to detect the SSIT signal because failure to do so will result in the call status being reported as CALL ANSWERED, when in fact the call should be aborted. The gap between an SSIT signal and the following recorded message can be quite small. In extreme cases, it will be considered to be a "glitch" and the SSIT will be combined with a portion of the following speech in one ON interval. In such a situation, if the reset-on-four rule was used to reset the single-tone counter 94, as little as four measurement intervals of speech occurring in the SSIT ON interval would result in failure to detect the SSIT.

Observations of signal type are counted for each ON interval. At the end of each ON interval, the signal-type with the largest counter value is determined by the peak factor decision logic 92 to be the signal-type for that interval.

I.C.5. CALL STATUS CONDITIONS REPORTED

The call status conditions reported by the illustrative system are summarized as follows:
(I) DIAL TONE PRESENT
(F) DIAL TONE ABSENT
(I) OUTPULSING A DIGIT
(F) DIAL TONE UNBREAKABLE
(I) MONITORING PROGRESS TONES
(I) PHONE RINGING
(F) CALL ANSWERED
(F) BUSY
(F) FAST BUSY
(F) RING NO ANSWER
(F) SSIT
(F) CALL PROGRESSION TIMEOUT Those conditions which are the final status of a call are indicated by (F); intermediate status conditions are indicated by (I). I.C.6. PROGRESS ANALYSIS DECISION-LOGIC (FIG. 4) The determination of the signal types of the ON intervals in combination with the durations of the ON intervals and the OFF intervals are used by the progress analysis decision logic 68 in the determination of the status of a call. This information is stored in a detector data table 100 (within the memory 46) with the general form shown in FIG. 4A. The data table 100 can store signal type and duration for each of the eight most recent ON/OFF intervals. The table 100 includes eight signal-type entries ($S_j$, $S_{j-1}$, $S_{j-2}$, $S_{j-3}$, $S_{j-4}$, $S_{j-5}$, $S_{j-6}$, and $S_{j-7}$) and eight ON/OFF interval duration entries ($T_j$, $T_{j-1}$, $T_{j-2}$, $T_{j-3}$, $T_{j-4}$, $T_{j-5}$, $T_{j-6}$, and $T_{j-7}$). Each signal-type entry has one or the logical values '0', '1T', '2T', and 'SP', which indicate no signal-type determination, single-tone, double-tone, and speech, respectively. The signal-type indicated for all OFF intervals is '0'. Each duration entry contains an indication of the length of the corresponding ON or OFF interval. The leftmost signal-type entry 102 contains the signal type of the most recent ON or OFF interval; the leftmost duration entry 104 contains the duration of the most recent ON or OFF interval. When data for a new ON/OFF interval has been determined the entries in the data table 100 are shifted to the right and the new data is added to the leftmost entries 102 and 104. FIG. 4B shows the data table 100 as it might look after the occurrence of a special service information tone followed by some speech. FIG. 4C shows the data table 100 as it might look after two rings. FIG. 4D shows the data table 100 as it might look during fast busy. FIG. 4E shows the data table 100 as it might look during prolonged ring. The progress analysis decision logic 86 also uses three flags in its operation; the first is set by the time measurement means 84 and the other two are set by the progress analysis decision logic 86:

SIGNAL-TIMEOUT starts at '0' and is set to '1' to indicate that a certain time has passed without any ON/OFF intervals occurring except those attributed to "glitches" (see the above discussion of the time measurement means 84);

FIRST is initialized to '1' and is set to '0' when the first table entry has been processed; and RING-FLAG indicates that a ring has previously been detected.

The progress analysis decision logic 86 monitors the leftmost signal-type entry 102 and the three flags, SIGNAL-TIMEOUT, FIRST, and RING-FLAG as follows.

A '0' in the leftmost signal-type entry 102 together with a non-zero duration entry 104 indicates a silence interval was present. If SIGNAL-TIMEOUT and FIRST are both set to '1', then the line has been monitored for 45 seconds after dialing with no sign of activity; the status reported in this case is CALL PROGRESSION TIMEOUT. If SIGNAL-TIMEOUT and RING-FLAG are both set to '1', then the telephone was ringing, but no new activity has been detected for 5 seconds; it is assumed that the telephone has been answered and the speech is below the energy threshold; CALL ANSWERED is reported. If SIGNAL-TIMEOUT is '0' then monitoring resumes.

A '1T' in the leftmost signal-type entry 102 indicates a single-tone signal was present. No further action is taken at this time, and monitoring resumes.

A '2T' in the leftmost signal-type entry 102 indicates some type of double-tone signal was present. If SIGNAL-TIMEOUT and FIRST both are set to '1' then DIAL TONE UNBREAKABLE is reported. When the first double-tone signal of duration 0.8 to 2.4 seconds is encountered, RING-FLAG is set to '1' and the energy threshold is lowered to 8. When the table contains four double-tone entries, checks are made for busy, fast busy, and double ring: If all the table entry durations are 0.4 to 0.6 seconds, status is reported as BUSY; if all the durations are 0.2 to 0.3 seconds, status is reported as FAST BUSY; if some of the durations fall within the busy range while others do not, it is assumed that double ring or and unknown ring pattern has occurred, and the number of maximum allowable rings is doubled from six to twelve and monitoring resumes. A counter 99 keeps track of the number of double-tone ON intervals. If the number of double-tones reaches the maximum allowable rings, the status is reported as RING NO ANSWER.

A 'SP' in the leftmost signal-type entry 102 indicates speech was present. If the signal-type entry for the previous ON interval 106 is '1T', then the status is reported as SSIT. If the signal-type entry for the previous ON interval 106 is '2T', then the status is reported as CALL ANSWERED. If the signal-type entry for the previous ON interval 106 is '0', then it is assumed that the telephone was answered before ring back occurred and the status is reported as CALL ANSWERED.

The programmable signal processor 12 can report several other status conditions. When the PSP has been commanded to wait for a dial tone before dialing, the status DIAL TONE ABSENT is reported if a double-tone signal is not detected within some predetermined time period. All the above-described status conditions are the final result of the call. Several intermediate status conditions can also be reported: MONITORING PROGRESS TONES, DIAL TONE PRESENT, PHONE RINGING, and OUTPULSING A DIGIT.

II. THEORETICAL CONSIDERATIONS
II.A. SYMBOLS AND TERMINOLOGY

These symbols will be used in the following discussion:

PF = peak factor
$PF_{irms}$ = ideal RMS-based peak factor
$PF_{rms}$ = measured RMS-based peak factor
$PF_{avm}$ = measured average-magnitude-based peak factor
1T = single-tone signal
2T = double-tone signal
SP = speech signal
SQRT(X) = square root of X
ABS(X) = absolute value of X (i.e., throws away the sign of X)
AVG(X) = average of X
AVM(X) = average magnitude = AVG(ABS(X))
RMS(X) = root mean square = SQRT(AVG(X$^2$))
NSR = noise-to-signal ratio
PI = 3.14159

II.B. "IDEAL" PEAK FACTORS

The RMS-based peak factor is the most analytically tractable and is expressed as $$PF_{irms} = PEAK/RMS$$

where PEAK is the most extreme value of the waveform (i.e., the maximum of the absolute value of the waveform) over some time interval, and RMS is the root mean square of the waveform computed over the same interval.

II.B.1. SINGLE-TONE SIGNALS

An ideal single-tone waveform can be expressed as $$A*SIN(2*PI*FREQUENCY*TIME+PHASE\ ANGLE)$$

It is well known that the RMS value of such a waveform is $$A/(SQRT(2))$$

and the peak value of such a waveform is $$A$$

Thus, the peak factor for a single-tone waveform is $$PF_{irms} = SQRT(2)$$

or about 1.414. Because SSITs are single-tone signals, they have an ideal peak factor of about 1.41, which is independent of tone frequency.

II.B.2. DOUBLE-TONE SIGNALS

For a waveform that is the sum of N tones, the peak factor can be derived as follows. The peak value of the sum of N tones each of peak amplitude A will occur when the peaks of the individual tones coincide and will therefore be $$PEAK = N*A$$

The RMS value of the sum of N tones each of amplitude A is $$A*SQRT(N/2)$$

Thus, the peak factor for the sum of N equal amplitude tones is $$PF_{irms} = SQRT(2*N)$$

Certain assumptions are implicit in the above derivation. The PEAK can actually be less than the sum of the PEAK values of the individual tones; this will occur if the relative frequencies and phases of the tones are such that there is no time during the measurement interval that the peaks of the individual tones coincide. Also, the measurement interval must be long enough so that the cross-products of the different tones each average to zero in order to obtain the RMS value above. Nonetheless, the above-derived equation for the peak factor is still a useful guide.

Dial tone, audible ring, busy, and fast busy share a common structure: each consists of the sum of two equal amplitude tones at different frequencies. Using the above-listed equation for the peak factor of the sum of tones, the ideal peak factor for these double-tone signals is $$PF_{irms} = SQRT(2*2) = 2.00$$

II.B.3 SPEECH

Experimental observations, supported by theoretical studies, have shown that the peak factor of speech typically occurs in the range 3.5 to 12, is almost always greater than 3, and a usual value is about 5.6.

It is important to note that not only do single-tone and double-tone signals have differing peak factors, but that these peak factors fall outside of the range of speech peak factors.

II.C. VARIATIONS FROM "IDEAL" PEAK FACTOR

For various reasons, the peak factor actually measured for real world signals will differ from the "ideal".

II.C.1. ADDITIVE NOISE

Additive wideband noise tends to increase the measured peak factor from the ideal. If it is assumed that the noise-to-signal ratio (NSR) is much less than 1.0 and that the noise fluctuates much more rapidly than the signal, then an approximate theoretical relationship between noise level and peak factor can be derived.

A peak estimator for Gaussian noise is given by $$B*RMS(noise)$$

where B is the number of standard deviations beyond which there is a negligible probability of occurrence; B = 4 is assumed for the numeric examples below.

The measured peak of noise plus signal will be less than about $$PEAK(signal) + B*RMS(noise),$$

and (assuming the signal is much larger than the noise) the measured peak factor will therefore be less than about $$(PEAK(signal)/RMS(signal)) + (B*RMS(noise)/RMS(signal))$$

in other words $$PF_{irms} \, PF_{rms} \, (PF_{irms} + B*NSR)$$

A somewhat more precise analysis yields the following:

$$PF_{irms} \, PF_{rms} \, (PF_{irms} + B*NSR)/(SQRT(1+NSR^2))$$

In a typical telephone noise environment the noise-to-signal ratio is better than −25dB (i.e., NSR=0.056). At this noise level, the above analysis indicates that the measured peak factor for single-tone signals, double-tone signals, and speech would fall within the following ranges:

| | | |
|---|---|---|
| 1.41 | $PF_{rms}(1T)$ | 1.64 |
| 2.00 | $PF_{rms}(2T)$ | 2.22 |
| 3.50 | $PF_{rms}(SP)$ | 12.21 |

II.C.2. HARMONIC DISTORTION

Harmonic distortion can add second and higher order harmonics to the individual tone or tones of a transmitted signal. This results in a received signal that has a peak factor that differs from the peak factor of the transmitted signal. For example, 10% second harmonic distortion of a single-tone signal (e.g., SSIT) increases the RMS peak factor from the ideal (about 1.41) to 1.58. As discussed above, additive noise also tends to increase the measured peak factor. The combination of both −25 dB noise and 10% harmonic distortion increases the peak factor of a single-tone signal from the ideal to 1.80. Thus, accurate identification of single-tone signals in real telephone systems requires extension of the single-tone peak factor range upward toward that of double-tones.

II.C.3. UNEQUAL TONE AMPLITUDES

Transmission of signals through a telephone network with frequency distortion (frequency response that is not flat) can result in the two tones of a double-tone signal being received at unequal amplitude. This tends to lower the peak factor of double-tone signals.

Although the tones of a double-tone signal are nominally equal in amplitude, in typical systems they can be expected to differ by as much as 8 dB (a ratio of tone amplitudes of about 2.5). This results in a change in the RMS peak factor from the ideal of 2.0 to 1.84. Thus, in order to operate in the presence of frequency distortion it is necessary to lower the bottom end of the peak factor range for double-tone signals. Fortunately, the presence of noise tends to correct, rather than exacerbate the change caused by frequency distortion. For example, −25 dB noise increases the peak factor from 1.84 (for unequal tone amplitudes) to 2.06 (for unequal tone amplitudes and additive noise).

II.D. MEASUREMENT INTERVAL

The measurement interval used in the above-described illustrative embodiment is about 37 msec., which is achieved by performing peak factor determinations on blocks of 256 samples in a system with a sampling rate of 7000 samples per second. This has been found to be adequate and its adequacy is consistent with the following theoretical analysis.

Theoretical analysis shows that the minimum time required to accurately measure peak factor for various signals is approximately as follows:
speech: 30 msec.
dial tone: 11 msec.
audible ring: 25 msec.
busy and fast busy: 7 msec.
SSIT: 2 msec.

To obtain a reasonably accurate measure of the peak factor of a voiced speech signal, at least one pitch period and preferably two pitch periods should be included in the measurement interval. Pitch periods range generally from about 3 msec (for high pitched female voices) to about 14 msec (for low pitched male voices). A 28 msec interval would encompass two pitch periods in the worst case.

For unvoiced speech, the analysis is more difficult. At 7000 samples/second, about half of the samples will be independent. Thus about 128 independent samples are available in a 37 msec interval of 256 samples. This number is sufficient to obtain a statistically significant measurement for unvoiced speech.

A double-tone waveform can be viewed as a sinusoidal waveform (at a frequency equal to half the sum of the frequencies of the two tones) modulated by another sinusoid (at a frequency equal to half the difference between the frequencies of the two tones); the resulting amplitude envelope of the basic sinusoid has a frequency equal to the difference between the two tones. For a reasonable measurement of peak factor of such a signal it is desirable to include in the measurement interval at least one period of the envelope. In the United States, a dial tone typically consists of the sum of a 350 Hz tone and a 440 Hz tone; the period of the resulting amplitude envelope is about 11 milliseconds. Audible ring is typically the combination of a 440 Hz tone and a 480 Hz tone, i.e., a 25 millisecond envelope period. Busy and fast busy are both the combination of a 480 Hz tone and a 620 Hz tone, i.e., a 7 millisecond envelope period.

SSITs are sequences of three single tones each of which has a frequency that is high enough to permit measurement of peak factor in less than the 7 milliseconds required for busy.

II.E. AVERAGE MAGNITUDE RATHER THAN RMS

RMS is one of the most widely used measures of the signal level of a waveform. One of its desirable characteristics is that theoretical analysis using RMS involves more tractable mathematical expressions than does analysis using some other measures of signal level. One of the disadvantages of RMS is that when used with digital signal processing systems, it is computationally intensive because a multiply is required for each sample.

Another measure of signal level is average magnitude. Average magnitude is easily computed in a digital signal processing system, and for this reason is chosen as the signal-level measure for the above-described illustrative embodiment.

II E.1. RELATION BETWEEN AVM AND RMS

For most actually encountered waveforms, average magnitude is roughly proportional to RMS, that is $$RMS/AVM = C$$

where C varies somewhat from signal-type to signal-type, but is essentially constant for each signal-type. As $$PF_{avm} = PEAK/AVM$$

$$PF_{rms} = PEAK/RMS$$

thus $$PF_{avm}/PF_{rms} = RMS/AVM = C$$

and $$PF_{avm} = PF_{rms}*(RMS/AVM) = PF_{rms}*C$$

For single-tone signals, $$RMS/AVM = PI*SQRT(2)/4$$

which is about 1.11.

For double-tone signals, RMS/AVM is approximately $$(PI^2)/8$$

which is about 1.23.

For speech, measurement of a large number of signals indicates that RMS/AVM is roughly in the range 1.2 to 1.4. Theoretical analysis of voiced speech (based on a Laplacian density-amplitude function) indicates that RMS/AVM is about $$SQRT(2)$$

which is about 1.41, and theoretical analysis of unvoiced speech (based on a Gaussian density-amplitude function) indicated that RMS/AVM is about $$1/SQRT(2/PI)$$

which is about 1.25.

II.E.2. AVM PEAK FACTOR RANGES CONSIDERING ADDITIVE NOISE

An analysis of the effect of additive noise similar to that discussed above in the context of RMS-based peak factor can be applied to peak factor based on average magnitude. The result is the following range:

$$C*PF_{irms}PF_{avm}C*(-PF_{irms}+B*NSR)/(1+C*SQRT(2/PI)*NSR)$$

where C is a constant for each signal type (C=RMS/AVM for the particular type of signal being considered). Thus, the ranges for $PF_{avm}$ are essentially the ranges for $PF_{rms}$ scaled by RMS/AVM.

The specific numeric values indicated by the theoretical for average-magnitude-based peak factor considering additive noise are as follows (using NSR=0.056 and B=4 in the above equation):

| | | |
|---|---|---|
| 1.57 | $PF_{avm}(1T)$ | 1.73 |
| 2.47 | $PF_{avm}(2T)$ | 2.60 |
| 4.39 | $PF_{avm}(SP)$ | 16.26 |

As discussed above, the theoretical analysis yields different RMS/AVM values for voiced and unvoiced speech; the single range for speech in the above table is produced by using the smaller RMS/AVM value to compute the lower bound, and by using the larger RMS/AVM value for the upper bound, to yield a range encompassing all speech.

The foregoing description has been limited to a specific embodiment of the invention. Additional advantages and modifications will be apparent to those skilled in the art. The invention is, therefore, not limited to the specific details, representative apparatus, and illustrative example shown and described in this specification. Rather, it is the object of the appended claims to cover all such variations and modifications as come within the true spirit and scope of the invention.

What is claimed as new and desired to be secured by Letters Patent of the United States is:

1. A call progress analyzer comprising:
    means for receiving waveforms from a telephone line;
    means defining a peak factor range, said range being associated with a particular signal type;
    measuring means for determining whether peak factors of waveforms received from the telephone line fall within said range and for providing a signal-type indication of said particular signal type in response to a determination that a peak factor falls within said range;
    call status decision logic for receiving said signal-type indication and for determining call status.

2. The system as claimed in claim 1, wherein said measuring means further comprises:
    means for creating digital samples representing a waveform received from the telephone line;
    means for defining measurement intervals and for associating a block of samples with each of the measurement intervals;
    means for determining the peak sample value in a measurement interval;
    means for making a determination of the signal level of the samples in a measurement interval.

3. The system as claimed in claim 2, wherein said measuring means further comprises:
    means for comparing the peak-to-signal-level ratio to the peak factor ranges by
        scaling the signal level determination by values indicative of the ranges; and
        comparing the peak determination with the scaled signal level determinations.

4. The system as claimed in claim 2, wherein the signal level determining means comprises means for computing the sum of the magnitudes of the samples in the interval.

5. The system claimed in claim 4 wherein the peak factor range for single-tone signals is less than about 2, the range for double-tone signals is between about 2 and about 3, and the range for speech signals is above about 3.

6. The system as claimed in claim 2, wherein the signal level determining means comprises means for computing the sum of the squares of the samples in the interval.

7. The call progress analyzer of claim 1 further comprising:
    means defining a second peak factor range, said second range being associated with a second signal type;
    means for determining whether peak factors of waveforms received from the telephone line fall within said second range and for providing a signal-type indication of the second signal type in response to a determination that a peak factor falls within said second range;
    and wherein said call status decision logic is also adapted to receive the signal-type indication of the second type.

8. The call progress analyzer claimed in claim 7, further comprising:
    means for defining a signal-level threshold;
    means for determining when the signal level of the waveform exceeds the defined threshold;

timing means for determining the durations of intervals during which the waveform signal level exceeds the threshold, and for determining the durations of the intervals during which the waveform is less than the threshold;

and wherein said call status decision logic is also adapted to receive the interval duration determinations.

9. The system as claimed in claim 8, wherein said measuring means further comprises:
means for creating digital samples representing a waveform received from the telephone line;
means for defining measurement intervals and for associating a block of samples with each of the measurement intervals;
means for determining the peak sample value in a measurement interval;
means for making a determination of the signal level of the samples in a measurement interval.

10. The system as claimed in claim 9, wherein the signal level determining means comprises means for computing the sum of the magnitudes of the samples in the interval.

11. An automatic call delivery system for connection to a telephone line comprising:
means for initiating a telephone call, including means for placing the telephone line in an off-hook condition and means for dialing a telephone number;
means for defining at least first and second peak factor ranges, said ranges being associated with first and second signal types, respectively;
peak factor determination means for determining whether peak factors of waveforms received from the telephone line fall within either of said ranges and for providing a signal-type indication of the associated signal type in response to a determination that a peak factor falls within one of said ranges;
delivery indication means for receiving said signal-type indications and for indicating that a call has been answered.

12. The automatic call delivery system as claimed in claim 11, wherein said peak factor determination means comprises:
means for receiving a waveform and for creating a series of digital samples representing the waveform;
means defining measurement intervals and for associating samples with the measurement intervals;
peak measurement means for determining the peak sample value for each measurement interval;
signal level measurement means for making a signal level determination for each measurement interval;
means for defining a peak factor range characteristic of signals of the first type and for defining a peak factor range characteristic of signals of the second type;
scaling means for scaling the signal level determination according to scale factors characteristic of peak factor ranges;
means for comparing the determined peak value with the scaled forms of signal level and for producing signal-type determinations.

13. The automatic call delivery system as claimed in claim 12 wherein the signal level measuring means comprises means for computing the sum of the magnitudes of the samples in the interval.

14. The automatic call delivery system as claimed in claim 12, further comprising:
means for defining a signal-level threshold;
means for determining when the signal level of the waveform exceeds the defined threshold;
timing means for determining the durations of intervals during which the waveform signal level exceeds the threshold, and for determining the durations of the intervals during which the waveform is less than the threshold;
and wherein said delivery indication means is also adapted to receive the interval duration determinations.

15. The automatic call delivery system as claimed in claim 11, wherein said means for defining ranges further comprises means for defining a third peak factor range associated with a third signal type, and wherein the first signal type is single-tone signals, the second signal type is double-tone signals, and the third signal type is speech.

16. A system for discriminating between the presence in a waveform of signals of a first type and signals of other types comprising:
means defining a peak factor range associated with signals of the first type;
measuring means, adapted to receive a representation of the waveform, for making at least one determination of peak factor of the waveform;
indicating means, responsive to the measuring means and to the range defining means, for indicating the presence of a signal of the first type when the determined peak factor is within the defined range.

17. The system as claimed in claim 16,
wherein said measuring means is adapted to receive representations of waveforms received from a telephone system by a caller attempting to place a call;
and further comprising call status determination logic for receiving signal presence determinations from the indicating means and for determining the status of the call.

18. A system for discriminating between the presence in a waveform of speech-type signals and signals of other types comprising:
means defining a peak factor range associated with speech-type signals;
measuring means, adapted to receive a representation of the waveform, for making at least one determination of peak factor of the waveform;
indicating means, responsive to the measuring means and to the range defining means, for indicating the presence of a speech-type signal when the determined peak factor is within the defined range.

19. The system as claimed in claim 18,
wherein said measuring means is adapted to receive representations of waveforms received from a telephone system by a caller attempting to place a call;
and further comprising call status determination logic for receiving signal presence determinations from the indicating means and for determining the status of the call.

20. A system for discriminating between the presence in a waveform of speech-type signals and tone-type signals comprising:
means defining a first peak factor range associated with speech-type signals and defining a second peak factor range associated with tone-type signals;

measuring means, adapted to receive a representation of the waveform, for making at least one determination of peak factor of the waveform;

indicating means, responsive to the measuring means and to the range defining means, for indicating the presence of a speech-type signal when the determined peak factor is within the first defined range and indicating the presence of a tone-type signal when the peak factor is within the second defined range.

21. The system as claimed in claim 20,
wherein said measuring means is adapted to receive representations of waveforms received from a telephone system by a caller attempting to place a call;
and further comprising call status determination logic for receiving signal presence determinations from the indicating means and for determining the status of the call.

22. A system for discriminating between the presence in a waveform of single-tone signals and double-tone signals comprising:
means defining a first peak factor range associated with single-tone signals and defining a second peak factor range associated with tone-type signals;
measuring means, adapted to receive a representation of the waveform, for making at least one determination of peak factor of the waveform;
indicating means, responsive to the measuring means and to the range defining means, for indicating the presence of a speech-type signal when the determined peak factor is within the first defined range and indicating the presence of a tone-type signal when the peak factor is within the second defined range.

23. The system as claimed in claim 22,
wherein said measuring means is adapted to receive representations of waveforms received from a telephone system by a caller attempting to place a call;
and further comprising call status determination logic for receiving signal presence determinations from the indicating means and for determining the status of the call.

24. A system for discriminating among the presence in a waveform of speech siganls, double-tone signals, and single-tone signals comprising:
means defining, a first peak factor range associated with speech signals, defining a second peak factor range associated with double-tone signals, and defining a third peak factor range associated with single-tone singals:
measuring means, adapted to receive a representation of the waveform, for making at least one determination of peak factor of the waveform;
indicating means, responsive to the measuring means and to the range defining means, for indicating the presence of a speech signal when the determined peak factor is within the first defined range, indicating the presence of a double-tone signal when the peak factor is within the second defined range, and indicating the presence of a single-tone signal when the peak factor is within the third defined range.

25. The system as claimed in claim 24,
wherein said measuring means is adapted to receive representations of waveforms received from a telephone system by a caller attempting to place a call;
and further comprising call status determination logic for receiving signal presence determinations from the indicating means and for determining the status of the call.

26. The system claimed in claim 24 wherein the peak factor range for single-tone signals is less than about 2, the range for double-tone signals is between about 2 and about 3, and the range for speech signals is above about 3.

27. A system for discriminating between the presence in a waveform of signals of a first type and signals of a second type comprising:
means for receiving a waveform and for creating a series of digital samples representing the waveform;
means defining measurement intervals and for associating samples with the measurement intervals;
peak measurement means for determining the peak sample value for each measurement interval;
signal level measurement means for making a signal level determination for each measurement interval;
means for defining a peak factor range characteristic of signals of the first type and for defining a peak factor range characteristic of signals of the second type;
scaling means for scaling the signal level determination according to scale factors characteristic of peak factor ranges;
means for comparing the determined peak value with the scaled forms of signal level and for producing signal-type determinations.

28. The system as claimed in claim 27 wherein the signal level measuring means comprises means for computing the sum of the magnitudes of the samples in the interval.

29. The system as claimed in claim 27, further comprising:
a single-tone counter, a double-tone counter, and a speech counter, each counter arranged to increment upon the determination of the associated signal type for a measurement interval;
decision logic means for determining the signal type for each ON interval by choosing the signal type corresponding to the counter with the largest count at the end of the ON interval.

30. The system as claimed in claim 29, further comprising:
reset means for resetting at least one of the counters when at least one of the other counters reaches a predetermined count.

31. The system as claimed in claim 29, wherein the waveform is from a telephone system, and further comprising:
call status determination logic for receiving signal-type determinations from the decision logic means and making call status determinations.

32. A method of determining the progress of a call comprising:
receiving waveforms from a telephone line;
making peak factor measurements of the received waveforms;
determining call status using the peak factor measurements.

33. The method of claim 32 further comprising the initial step of defining a peak factor range, and further, wherein the step of determining call status comprises the step of determining whether a peak factor measurement falls within the range.

34. A method for discriminating between the presence in a waveform of signals of a first type and signals of other types comprising:
- defining a peak factor range associated with signals of the first type;
- receiving a representation of the waveform;
- making a determination of peak factor of the waveform;
- indicating the presence of a signal of the first type when the determined peak factor is within the defined range.

35. The method of claim 34 wherein the signals of the first type are speech-type signals.

36. A method for discriminating between the presence in a waveform of signals of a first type and signals of a second type comprising:
- defining first and second peak factor ranges associated with signals of the first type and signals of the second type, respectively;
- receiving a representation of the waveform;
- making a determination of peak factor of the waveform;
- indicating the presence of a signal of the first type when the determined peak factor is within the first range and indicating the presence of a signal of the second type when the peak factor is within the second range.

37. The method of claim 36 wherein the signal of the first type are speech-type signals and wherein the signals of the second type are tone-type signals.

38. The method of claim 36 wherein the signals of the first type are single-tone-type signals and wherein the signals of the second type are double-tone-type signals.

39. A method for discriminating among the presence in a waveform of speech-type signals, single-tone-signals, and double-tone-type signals comprising:
- defining first, second, and third peak factor ranges associated with speech-type, single-tone-type, and double-tone-type tone-type signals, respectively;
- receiving a representation of the waveform;
- making a determination of peak factor of the waveform;
- indicating the presence of a speech-type signal when the determined peack factor is within the first range, indicating the presence of a single-tone-type signal when the peak factor is within the second range, and indicating the presence of a double-tone-type signal when the peak factor is within the third range.

40. A method for discriminating between the presence in a waveform of signals of a first type and signals of a second type comprising:
- defining first and second peak factor ranges associated with signals of the first type and signals of the second type, respectively;
- creating a series of digital samples representing an interval of the waveform;
- determining the peak sample value for the interval;
- making a signal level determination for the interval;
- comparing the peak factor of the interval with the peak factor ranges.

41. The method of claim 40 wherein the step of comparing the peak factor with the peak factor ranges comprises:
- scaling the signal level determination according to scale factors characteristic of the peak factor ranges;
- comparing the determined peak value with the scaled forms of signal level.

* * * * *